United States Patent
Talan et al.

(10) Patent No.: US 7,685,033 B2
(45) Date of Patent: Mar. 23, 2010

(54) METHOD AND APPARATUS FOR AUTOMATICALLY MAPPING ACCOUNT-DATA TO TAX-FORMS

(75) Inventors: Jonathan M. Talan, Frisco, TX (US); Thomas R. Palfreyman, Flower Mound, TX (US); Eric M. Grose, Frisco, TX (US); Suzan K. Hollis, McKinney, TX (US)

(73) Assignee: Intuit Inc., Mountain View, CA (US)

( * ) Notice: Subject to any disclaimer, the term of this patent is extended or adjusted under 35 U.S.C. 154(b) by 486 days.

(21) Appl. No.: 11/642,099

(22) Filed: Dec. 19, 2006

(65) Prior Publication Data

US 2008/0147528 A1 Jun. 19, 2008

(51) Int. Cl.
G06F 17/22 (2006.01)

(52) U.S. Cl. .......................................... 705/31
(58) Field of Classification Search ................ 705/1, 705/15, 31
See application file for complete search history.

(56) References Cited

U.S. PATENT DOCUMENTS

| | | | |
|---|---|---|---|
| H001830 H * | 1/2000 | Petrimoulx et al. ........... 705/31 |
| 7,234,103 B1 * | 6/2007 | Regan ........................ 715/234 |
| 7,283,986 B2 * | 10/2007 | Okunseinde et al. ........... 707/1 |
| 2002/0111888 A1 * | 8/2002 | Stanley et al. ................. 705/31 |
| 2003/0055754 A1 * | 3/2003 | Sullivan ...................... 705/31 |
| 2003/0105687 A1 * | 6/2003 | Bross et al. ................... 705/31 |
| 2003/0144930 A1 * | 7/2003 | Kulkarni et al. ............... 705/31 |
| 2004/0030619 A1 * | 2/2004 | Stokes et al. .................. 705/31 |

OTHER PUBLICATIONS

Anonymous, . "IDMS, Inc.—Account Ability Tax Form Preparation." Rev. of: title_of_work_reviewed_in_italics, clarifying_information. CPA Technology Advisor Oct. 1, 2009: Accounting & Tax Periodicals, ProQuest. Web. Nov. 8, 2009.*

* cited by examiner

*Primary Examiner*—Matthew S Gart
*Assistant Examiner*—Oluseye Iwarere
(74) *Attorney, Agent, or Firm*—Park, Vaughan & Fleming LLP

(57) ABSTRACT

One embodiment of the present invention provides a system that automatically inserts account-data into a tax-form. During operation, the system receives account-data at a server from a data-provider. The system also receives a tax-form at the server from an application. Next, the system automatically analyzes the account-data to determine a data-map which maps the account-data to the tax-form without assistance from a user. Finally, the system inserts the account-data into the tax-form by applying the data-map to the account-data.

22 Claims, 5 Drawing Sheets

METHOD AND APPARATUS FOR AUTOMATICALLY MAPPING ACCOUNT-DATA TO TAX-FORMS

BACKGROUND

Related Art

Accountants typically use tax software to help prepare and file returns for their clients. Using this software typically involves transferring account-data from the clients' financial records to tax-forms in the tax software. Unfortunately, the task of determining how to transfer or map the data to these tax-forms can be a long and tedious process. Furthermore, if the account-data changes, the determined mapping may no longer be valid, which requires the accountant to repeat the mapping process.

This problem is further complicated by the fact that accountants usually have many clients, each of which have different types of accounts that require different mappings to the tax-forms. Furthermore, different accountants rarely map accounts in the same way. Consequently, it is difficult to assign a specific mapping to a given type of account.

SUMMARY

One embodiment of the present invention provides a system that automatically inserts account-data into a tax-form. During operation, the system receives account-data at a server from a data-provider. The system also receives a tax-form at the server from an application. Next, the system automatically analyzes the account-data to determine a data-map which maps the account-data to the tax-form without assistance from a user. Finally, the system inserts the account-data into the tax-form by applying the data-map to the account-data.

In a variation on this embodiment, determining the data-map involves first identifying a subset of account-data. The system then determines if a data-map exists in a map-database for the subset of account-data and the tax-form. If so, the system obtains the data-map from the map-database.

In a further variation, the subset of account-data can include meta-data which describes the account-data.

In a further variation, after obtaining the data-map, the system presents the data-map to the user.

In a further variation, if the data-map does not exist in the map-database, the system sends a request to the user to create the data-map. In response to the request, the system receives the data-map from the user. The system then stores the data-map in the map-database.

In a further variation, if multiple data-maps are associated with the subset of account-data and the tax-form, the system selects one of: a best-fit data-map, which statistically matches the subset of account-data more accurately than other associated data-maps; a default pre-selected data-map; a historically-preferred data-map, which has historically been selected more often than other associated data-maps; or a user-selected data-map that the user selects from the multiple data-maps.

In a variation on this embodiment, if the account-data is modified, the system identifies a subset of the modified account-data. Next, the system determines if the data-map is also associated with the subset of modified account-data and the tax-form. If so, the system inserts the modified account-data into the tax-form by applying the data-map to the modified account-data. If not, the system identifies a second data-map from the map-database for the subset of modified account-data and the tax-form. The system then inserts the modified account-data into the tax-form by applying the second data-map to the modified account-data.

In a variation on this embodiment, the system can also apply a third data-map to a subset of the account-data.

In a variation on this embodiment, applying the data-map can involve performing an operation on the account-data.

DETAILED DESCRIPTION

Figure 1:
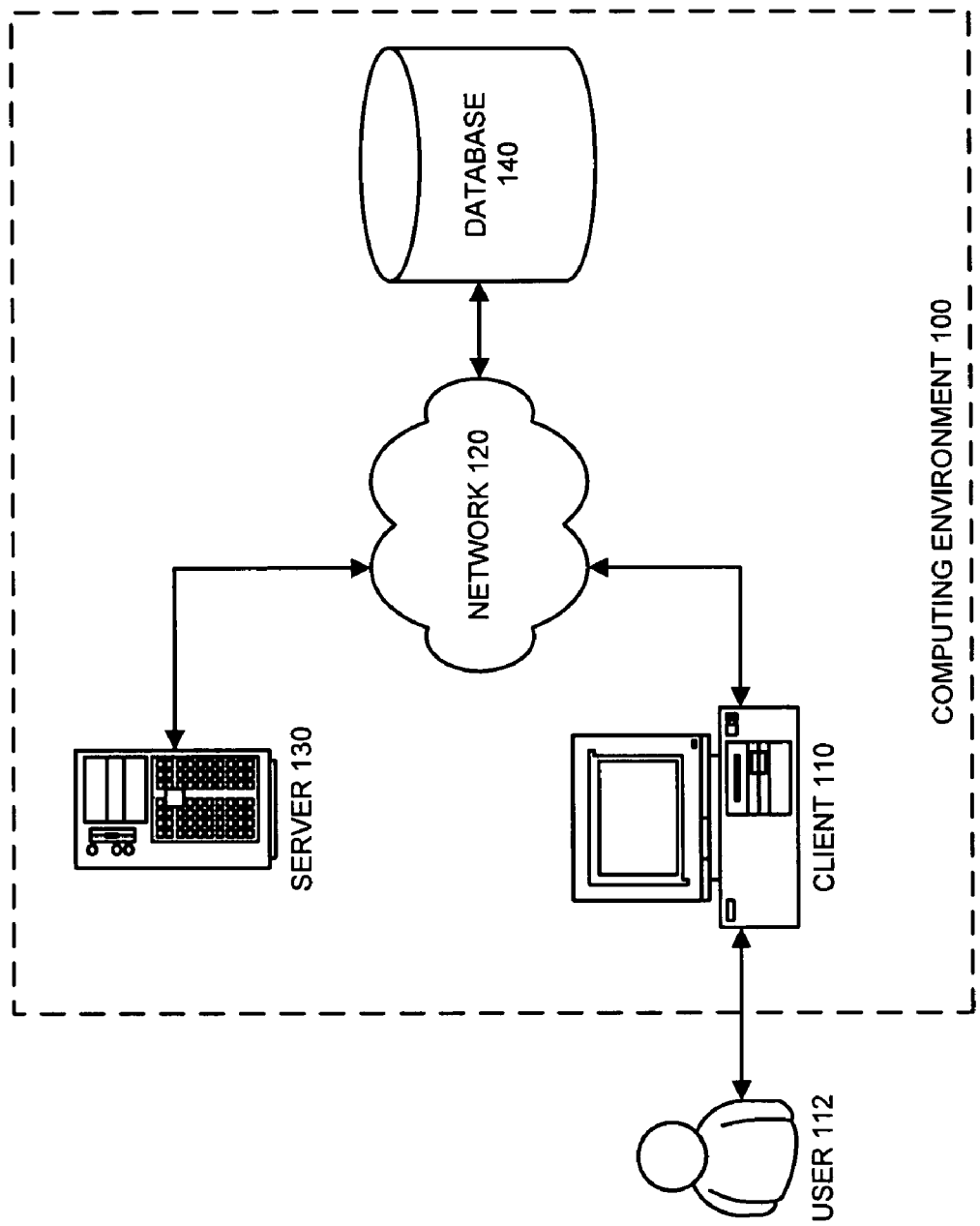
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention provides a mapping system that automatically determines a data-map, which maps account-data to a tax-form or to a set of tax-forms. In doing so, the mapping system compares key data-elements associated with the account-data and the set of tax-forms to key data-elements associated with data-maps stored on a map-database. Note that different key data-elements may be associated with different data-maps. These key data-elements can include a subset of the account-data and meta-data, such as: an account-type; a detailed account-type; a name or description of an account; a tax module (e.g. Individual, Corporation, S-Corporation, etc.); and a schedule or company type. Note that account-data can generally include any data that may be associated with financial records.

In one embodiment of the present invention, the mapping system can select a data-map based on: a best-fit; a pre-selected default; a historical preference; a tax-system based prioritization; a user-determined prioritization; a weighted best-fit; and any other method for selecting a data-map from a plurality of data-maps.

In one embodiment of the present invention, the mapping system identifies a single data-map that maps the account-data to the set of tax-forms. In this embodiment, the mapping system selects this unique data-map.

In one embodiment of the present invention, if the mapping system cannot determine a data-map that maps the account-data to the set of tax-forms, the mapping system can request that the user manually map the account-data to the set of tax-forms. The mapping system then "learns" this new mapping by adding the newly created data-map to the map-database, thereby increasing the number of data-maps that are available for future mappings.

In one embodiment of the present invention, an administrator can initially populate the map-database with: data-maps provided by the mapping system's developer; historical data-maps from previous years usage of the map-database; and third-party data-maps that users have uploaded to a user-contribution system.

In one embodiment of the present invention, the map-database is not pre-populated with data-maps.

Computing Environment

FIG. 1 illustrates a computing environment 100 in accordance with an embodiment of the present invention. Computing environment 100 includes a number of computer systems. These computer systems can generally include any type of computer system based on a microprocessor, a mainframe computer, a digital signal processor, a portable computing device, a personal organizer, a device controller, or a computational engine within an appliance. More specifically, computing environment 100 includes client 110, network 120, server 130, and database 140.

Client 110 can generally include any node on a network including computational capability and including a mechanism for communicating across the network.

Network 120 can generally include any type of wired or wireless communication channel capable of coupling together computing nodes. This includes, but is not limited to, a local area network, a wide area network, or a combination of networks. In one embodiment of the present invention, network 120 comprises the Internet.

Server 130 can generally include any computational node including a mechanism for servicing requests from a client for computational and/or data storage resources. In one embodiment of the present invention, server 130 can include a system for mapping account-data to a set of tax-forms.

Database 140 can generally include any type of system for storing data in non-volatile storage. This includes, but is not limited to, systems based upon magnetic, optical, and magneto-optical storage devices, as well as storage devices based on flash memory and/or battery-backed up memory. In one embodiment of the present invention, database 140 can include a map-database that stores data-maps, which map account-data to a set of tax-forms.

In one embodiment of the present invention, user 112 is an accountant who is preparing tax forms on behalf of a client. In doing so, user 112 transfers account-data associated with accounts on a chart of accounts to the tax-forms. Thus, user 112 uses client 110 to send the chart of accounts and the tax-forms to server 130. Server 130 then identifies from the chart of accounts a subset of account-data and meta-data associated with the accounts. Next, server 130 searches database 140 for a data-map associated with the subset of account-data and meta-data that specifies a mapping between the account-data and the tax-forms. Finally, server 130 inserts the account-data into the tax-forms by applying the data-map, which describes how to insert the account-data into the tax-forms.

In one embodiment of the present invention, server 130 may also identify a subset of fields from the tax-forms and meta-data associated with the tax-forms. In this embodiment, server 130 searches database 140 for a data-map that is associated with both the subset of account-data and meta-data associated with the accounts, and the subset of fields from the tax-forms and meta-data associated with the tax-forms.

Mapping System

Figure 2:
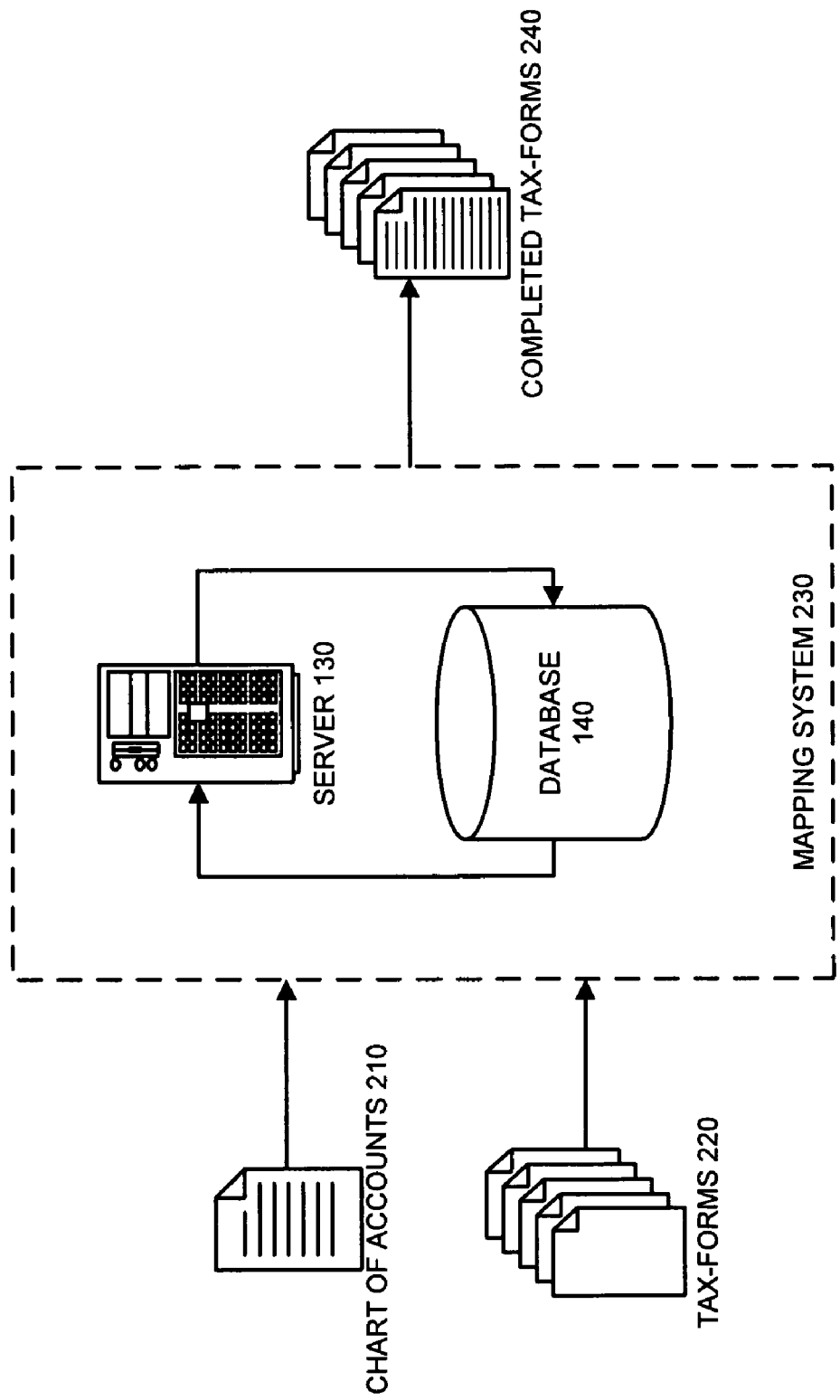
FIG. 2 illustrates a mapping system in accordance with an embodiment of the present invention.

FIG. 2 illustrates a mapping system 230 in accordance with an embodiment of the present invention. Mapping system 230 can generally include server 130 and database 140 which can communicate with each other directly or via network 120.

Chart of accounts 210 is a list of accounts that are associated with an organization. In one embodiment of the present invention, chart of accounts 210 includes account-data associated with the accounts listed on chart of accounts 210.

In one embodiment of the present invention, chart of accounts 210 is not limited to account-data, but can include any type of data that mapping system 230 can insert into a form.

Tax-forms 220 can include any type of tax-form including Internal Revenue Service (IRS) forms and user-created forms. In one embodiment of the present invention, tax-forms 220 is not limited to tax forms, but can include any type of form that includes data-entry fields.

Completed tax-forms 240 are generated by inserting the account-data associated with chart of accounts 210 into tax-forms 220. This process uses a data-map associated with chart of accounts 210 and tax-forms 220 which specifies how to insert the account-data into tax-forms 220.

During operation, mapping system 230 accepts chart of accounts 210 and tax-forms 220 as input. Mapping system 230 then identifies key data-elements associated with chart of account 210 and tax-forms 220. These key data-elements can include: a pre-determined subset of account-data associated with chart of accounts 210; meta-data associated with chart of accounts 210; a pre-determined set of fields from tax-forms 220; and meta-data that is associated with tax-forms 220. Next, mapping system 230 identifies a data-map that maps the account-data to tax-forms 220 and is associated with the key data-elements. Then, mapping system 230 applies this data-map to chart of accounts 210 and tax-forms 220 to create completed tax-forms 240.

Mapping Account-Data to Tax-Forms

Figure 3:
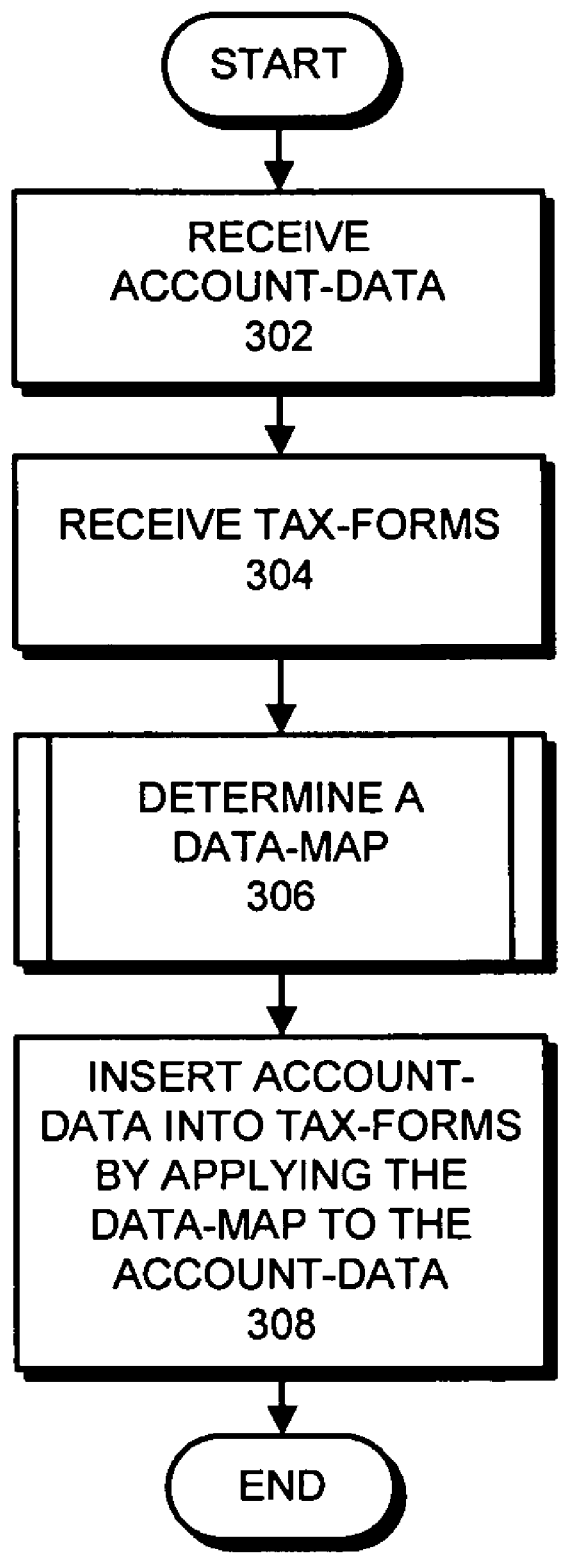
FIG. 3 presents a flow chart illustrating the process of mapping account-data to tax-forms in accordance with an embodiment of the present invention.

FIG. 3 presents a flow chart illustrating the process of mapping account-data to tax-forms 220 in accordance with an embodiment of the present invention. The process begins when mapping system 230 receives account-data from a data-provider, such as user 112 (step 302). Note that a data-provider can include a user, such as an accountant, or a system or an application, such as a database system or an accounting application.

In one embodiment of the present invention, mapping system 230 receives chart of accounts 210, which either includes or references the account-data.

Mapping system 230 also receives tax-forms 220 from an application (step 304). Note that the application can include any type of accounting application, or form-processing application. In one embodiment of the present invention, user 112 can also provide tax-forms 220 to mapping system 230.

Mapping system 230 then determines a data-map that maps the account-data to tax-forms 220 (step 306). Note that this is a multi-step process, which is described in more detail below with reference to FIG. 4.

The process concludes when mapping system 230 applies the data-map to the account-data to produce completed tax-forms 240 (step 308). Note that this involves inserting the account-data into tax-forms 220 using the data-map.

In one embodiment of the present invention, after using the data-map to insert the account-data into tax-forms 220, mapping system 230 updates a set of data-map usage-statistics. These statistics indicate how often and in what circumstances mapping system 230 selects a given data-map. This embodiment enables statistical selection of data-maps involving historical or weighted statistics.

In one embodiment of the present invention, mapping system 230 can apply a data-map to a subset of the account-data.

In one embodiment of the present invention, mapping system 230 can apply multiple data-maps to the account-data. In this embodiment, mapping system 230 applies different data-maps to different subsets of the account-data.

In one embodiment of the present invention, applying the data-map can involve performing an operation on the account-data. These operations can include combining subsets of the account-data by applying mathematical operations to the subsets of account-data. For example, mapping system 230 may add wages paid to full-time employees and wages paid to part-time employees together and then may insert the result into tax-forms 220.

In one embodiment of the present invention, the result of performing operations, such as mathematical or logical operations, on subsets of the account-data may determine which data-map mapping system 230 selects, or how mapping system 230 applies a given data-map.

Determining a Data-Map

Figure 4:
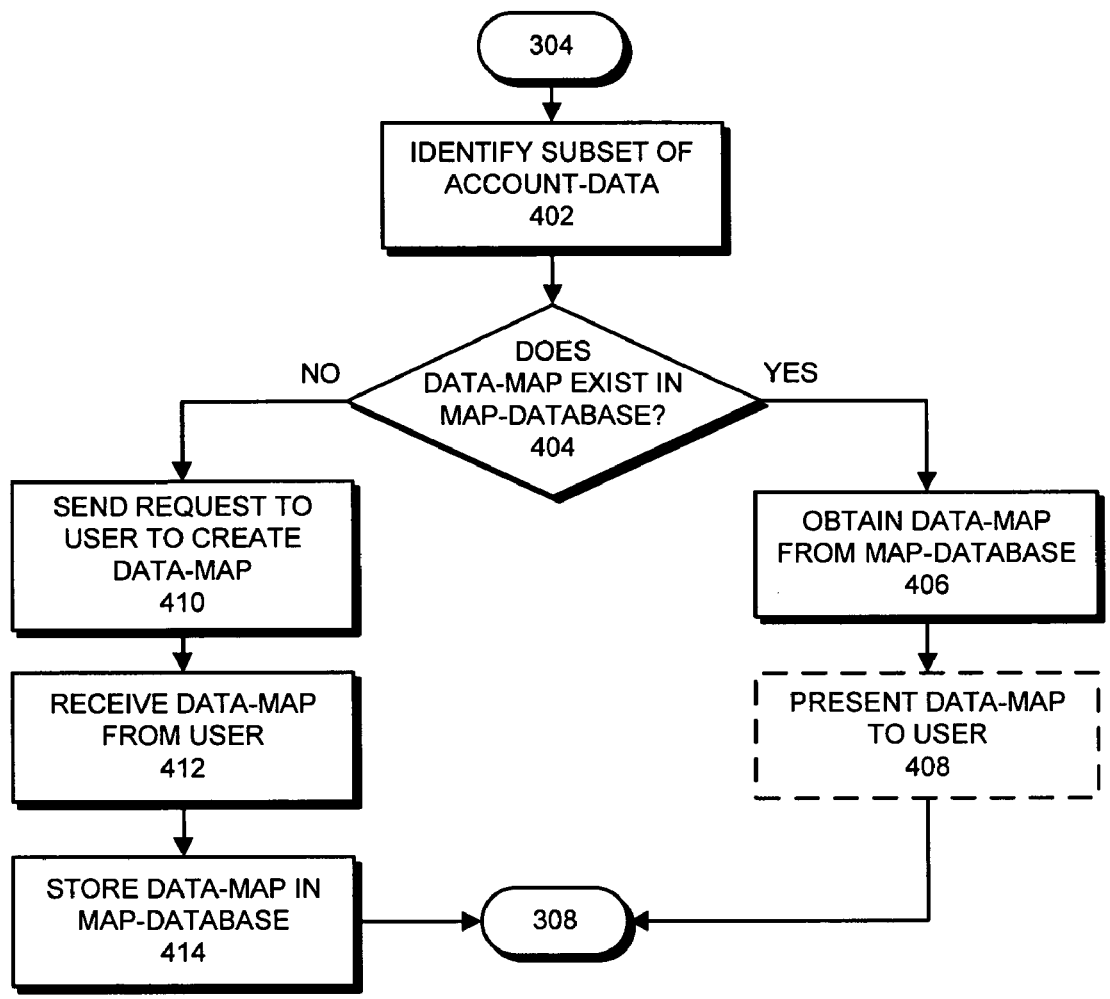
FIG. 4 presents a flow chart illustrating the process of determining a data-map in accordance with an embodiment of the present invention.

FIG. 4 presents a flow chart illustrating the process of determining a data-map in accordance with an embodiment of the present invention. The process begins when mapping system 230 identifies a subset of account-data (step 402). Note that this may involve identifying meta-data associated with the account-data. This meta-data can include: an account type; an account description and/or account name; and any other meta-data that can be associated with account-data. Furthermore, note that chart of accounts 210 can include or reference the account-data.

In one embodiment of the present invention, mapping system 230 also identifies meta-data associated with tax-forms 220. This meta-data can include: a tax module type, such as Individual, Corporation, S-Corporation, etc.; a schedule type and/or company type; and any other meta-data that can be associated with tax-forms 220. In this embodiment, mapping system 230 may also identify subfields associated with tax-forms 220.

Next, using the subset of account-data and the meta-data, mapping system 230 determines if a data-map exists that is associated with the account-data (or chart of accounts 210) and tax-forms 220 (step 404). Note that this may involve searching database 140 for the data-map.

In one embodiment of the present invention, mapping system 230 uses a subset of fields from tax-forms 220 and meta-data associated with tax-forms 220 to help identify a data-map associated with the account-data (or chart of accounts 210) and tax-forms 220.

If a data-map associated with the account-data (or chart of accounts 210) and tax-forms 220 exists, mapping system 230 obtains the data-map from database 140 (step 406). Mapping system 230 then proceeds to step 308.

In one embodiment of the present invention, if multiple data-maps are associated with the subset of account-data and tax-forms 220, mapping system 230 can select: a best-fit data-map, which statistically matches the subset of account-data more accurately than other associated data-maps; a default pre-selected data-map; a historically preferred data-map, which has historically been selected more often than other associated data-maps; a user-selected data-map that user 112 selects from the multiple data-maps; and any other data-map that user 112 or mapping system 230 can specify.

In one embodiment of the present invention, mapping system 230 presents the data-map to user 112 (step 408). This embodiment enables user 112 to confirm the data-map that mapping system 230 selected. If user 112 does not like mapping system 230's selection, user 112: can select a different data-map; can modify the selected data-map; or can create a new data-map. This step is optional as is illustrated by the dashed lines surrounding step 408.

If a data-map does not exist that is associated with the account-data (or chart of accounts 210) and tax-forms 220, mapping system 230 sends a request to user 112 to create a new data-map that maps the account-data to tax-forms 220 (step 410). Mapping system 230 then receives a data-map from user 112, which specifies a mapping between the account-data and tax-forms 220 (step 412). Next, mapping system 230 stores the data-map in database 140 (step 414). Mapping system 230 then proceeds to step 308.

In one embodiment of the present invention, mapping system 230 does not send a request to user 112 to create a new data-map. Instead, mapping system 230 automatically generates a new data-map that maps the account-data to tax-forms 220 using: historical data; statistical data; data from a second user; data from database 140; and any other data that can facilitate mapping system 230 automatically generating a new data-map.

Mapping Modified Account-Data

Figure 5:
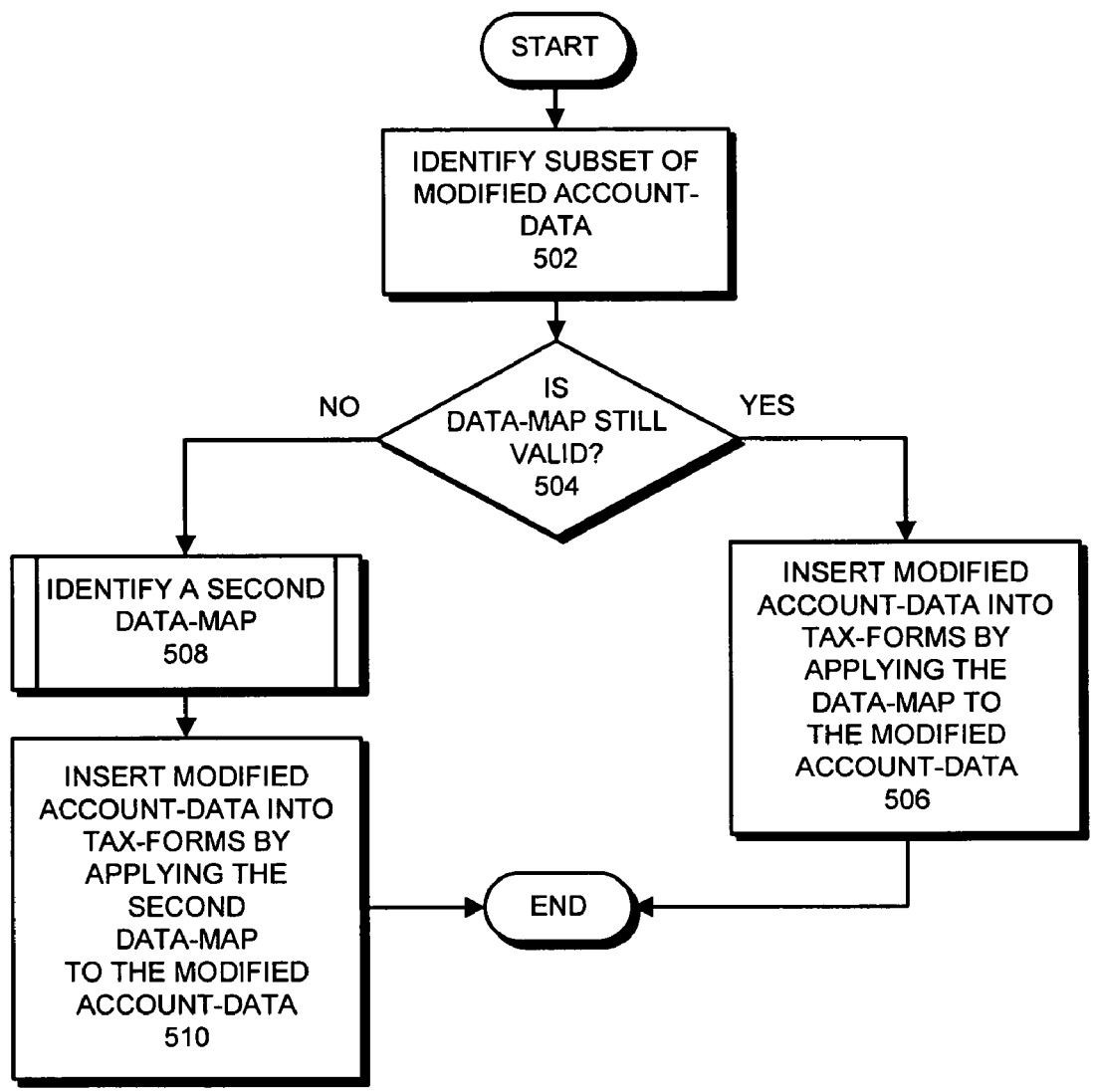
FIG. 5 presents a flow chart illustrating the process of mapping modified account-data to tax-forms in accordance with an embodiment of the present invention.

FIG. 5 presents a flow chart illustrating the process of mapping modified account-data to tax-forms 220 in accordance with an embodiment of the present invention. Note that this process is applied to account-data that mapping system 230 previously inserted into tax-forms 220 by applying a previously identified data-map. The process begins when mapping system 230 identifies a subset of modified account-data (step 502). Mapping system 230 then determines if the previously applied data-map is still valid (step 504). Note that determining if the previously applied data-map is valid involves determining if the previously applied data-map is associated with the subset of the modified account-data and tax-forms 220. If so, mapping system 230 applies the previously identified data-map to the modified account-data and tax-forms 220 to create a modified version of completed tax-forms 240 (step 506).

If the previously identified data-map is no longer valid, mapping system 230 identifies a second data-map that is associated with the subset of modified account-data and tax-forms 220 (step 508). Note that this is a multi-step process, which is analogous to the process described above with reference to FIG. 4.

Next, mapping system 230 applies the second data-map to the modified account-data (step 510). This involves inserting the modified account-data into tax-forms 220 as the second data-map specifies.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for automatically inserting account-data into a tax-form, wherein the computer comprises a processor, the method comprising:
   receiving at a server account-data from a data-provider;
   receiving at the server a tax-form from an application;
   automatically analyzing the account-data to determine a data-map which maps the account-data to the tax-form without assistance from a user, wherein determining the data-map involves:
      identifying a subset of account-data;
      determining that one or more data-maps are associated with the subset of account-data and the tax-form; and
      selecting:
         a best-fit data-map, which statistically matches the subset of account-data more accurately than other associated data-maps;
         a default pre-selected data-map;
         a historically-preferred data-map, which has historically been selected more often than other associated data-maps; or
         a user-selected data-map that the user selects from the one or more data-maps;
   inserting the account-data into the tax-form by applying the data-map to the account-data; and
   updating data-map usage-statistics indicating how often and in what circumstances the data-map is selected, thereby enabling statistical selection of data-maps based on at least historical or weighted statistics.

2. The method of claim 1, wherein determining the data map further involves:
   determining that the data-map exists in a map-database for the subset of account-data and the tax-form; and
   obtaining the data-map from the map-database.

3. The method of claim 2, wherein the subset of account-data can include meta-data which describes the account-data.

4. The method of claim 2, wherein after obtaining the data-map, the method further comprises presenting the data-map to the user.

5. The method of claim 1, further comprising:
   determining that the account data is modified;
   identifying a subset of the modified account-data;
   determining whether the data-map is also associated with the subset of modified account-data and the tax-form;
   responsive to determining that the data-map is also associated with the subset of modified account-data and the tax-form, inserting the modified account-data into the tax-form by applying the data-map to the modified account-data; and
   responsive to determining that the data-map is not associated with the subset of modified account-data and the tax-form,
      identifying a second data-map from the map-database for the subset of modified account-data and the tax-form, and
      inserting the modified account-data into the tax-form by applying the second data-map to the modified account-data.

6. The method of claim 1, wherein a third data-map can be applied to a subset of the account-data.

7. The method of claim 1, wherein applying the data-map can involve performing an operation on the account-data.

8. A computer-readable storage device storing instructions that when executed by a computer cause the computer to perform a method for automatically inserting account-data into a tax-form, the method comprising:
   receiving at a server account-data from a data-provider;
   receiving at the server a tax-form from an application;
   automatically analyzing the account-data to determine a data-map which maps the account-data to the tax-form without assistance from a user, wherein determining the data-map involves:
      identifying a subset of account-data;
      determining that one or more data-maps are associated with the subset of account-data and the tax-form; and
      selecting:
         a best-fit data-map, which statistically matches the subset of account-data more accurately than other associated data-maps;
         a default pre-selected data-map;
         a historically-preferred data-map, which has historically been selected more often than other associated data-maps; or
         a user-selected data-map that the user selects from the one or more data-maps;
   inserting the account-data into the tax-form by applying the data-map to the account-data; and
   updating data-map usage-statistics indicating how often and in what circumstances the data-map is selected, thereby enabling statistical selection of data-maps based on at least historical or weighted statistics.

9. The computer-readable storage device of claim 8, wherein determining the data-map further involves:
   determining that the data-map exists in a map-database for the subset of account-data and the tax-form; and
   obtaining the data-map from the map-database.

10. The computer-readable storage device of claim 9, wherein the subset of account-data can include meta-data which describes the account-data.

11. The computer-readable storage device of claim 9, wherein after obtaining the data-map, the method further comprises presenting the data-map to the user.

12. The computer-readable storage device of claim 8, the method further comprising:
   determining that the account data is modified;
   identifying a subset of the modified account-data;
   determining whether the data-map is also associated with the subset of modified account-data and the tax-form;
   responsive to determining that the data-map is also associated with the subset of modified account-data and the tax-form, inserting the modified account-data into the tax-form by applying the data-map to the modified account-data; and
   responsive to determining that the data-map is not associated with the subset of modified account-data and the tax-form,
      identifying a second data-map from the map-database for the subset of modified account-data and the tax-form, and
      inserting the modified account-data into the tax-form by applying the second data-map to the modified account-data.

13. The computer-readable storage device of claim 8, wherein a third data-map can be applied to a subset of the account-data.

14. The computer-readable storage device of claim 8, wherein applying the data-map can involve performing an operation on the account-data.

15. An apparatus that automatically inserts account-data into a tax-form, comprising:
   a receiving mechanism at a sewer configured to receive account-data from a data-provider;
   wherein the receiving mechanism is further configured to receive at the sewer a tax-form from an application;
   an analysis mechanism configured to automatically analyze the account-data to determine a data-map which maps the account-data to the tax-form without assistance from a user, wherein while analyzing the account-data the analysis mechanism is configured to:
      identify a subset of account-data;
      determine that one or more data-maps are associated with the subset of account-data and the tax-form;
   a selection mechanism configured to select:
      a best-fit data-map, which statistically matches the subset of account-data more accurately than other associated data-maps;
      a default pre-selected data-map;
      a historically-preferred data-map, which has historically been selected more often than other associated data-maps; or
      a user-selected data-map that the user selects from the one or more data-maps;
   an insertion mechanism configured to insert the account-data into the tax-form by applying the data-map to the account-data; and
   an updating mechanism configured to update data-map usage-statistics indicating how often and in what circumstances the data-map is selected, thereby enabling statistical selection of data-maps based on at least historical or weighted statistics.

16. The apparatus of claim 15, wherein
   while analyzing the account-data the analyzing mechanism is further configured to:
      determine that the data-map exists on a map-database for the subset of account-data and the tax-form; and
      obtain the data-map from the map-database.

17. The apparatus of claim 16, further comprising a presentation mechanism configured to present the data-map to the user.

18. The apparatus of claim 16, further comprising:
   a sending mechanism configured to send a request to the user to create the data-map;
   wherein the receiving mechanism is configured to receive the data-map from the user; and
   a storage mechanism configured to store the data-map in the map-database.

19. The apparatus of claim 15, wherein the analysis mechanism is configured to:
   identify a subset of the modified account-data;
   determine whether the data-map is associated with the subset of the modified account-data and the tax-form;
   responsive to determining that the data map is associated with the subset of the modified account-data, insert the modified account-data into the tax-form by applying the data-map to the modified account-data;
   responsive to determining that the data map is associated with the subset of the modified account-data, the analysis mechanism is configured to identify a second data-map from the map-database associated with the subset of the modified account-data and the tax-form; and to
   insert the modified account-data into the tax-form by applying the second data-map to the modified account-data.

20. The apparatus of claim 15, further comprising an execution mechanism configured to perform one or more operations on the account-data.

21. The method of claim 1, wherein determining the data-map involves:
   sending a request to the user to create the data-map;
   receiving the data-map from the user; and
   storing the data-map in the map-database.

22. The computer-readable storage device of claim 8, wherein the method further comprises:
   determining that the data-map does not exist in the database;
   sending a request to the user to create the data-map;
   receiving the data-map from the user; and
   storing the data-map in the map-database.

* * * * *

UNITED STATES PATENT AND TRADEMARK OFFICE
CERTIFICATE OF CORRECTION

PATENT NO.         : 7,685,033 B2                                        Page 1 of 1
APPLICATION NO.    : 11/642099
DATED              : March 23, 2010
INVENTOR(S)        : Jonathan M. Talan et al.

It is certified that error appears in the above-identified patent and that said Letters Patent is hereby corrected as shown below:

In claim 15 (at column 9, line 6), please replace the word "sewer" with the word --server--.

In claim 15 (at column 9, line 9), please replace the word "sewer" with the word --server--.

Signed and Sealed this

Eighteenth Day of May, 2010

David J. Kappos
*Director of the United States Patent and Trademark Office*